(12) United States Patent
Nesnidal (10) Patent No.: US 8,014,070 B2
(45) Date of Patent: Sep. 6, 2011

(54) MEMBRANE GRATING FOR BEAM STEERING DEVICE AND METHOD OF FABRICATING SAME

(75) Inventor: Michael P. Nesnidal, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 12/804,425

(22) Filed: Jul. 21, 2010

(65) Prior Publication Data

US 2010/0296162 A1 Nov. 25, 2010

Related U.S. Application Data

(62) Division of application No. 12/062,205, filed on Apr. 3, 2008.

(60) Provisional application No. 60/922,128, filed on Apr. 6, 2007.

(51) Int. Cl.
*G02B 5/18* (2006.01)
*G02B 27/44* (2006.01)
*G02F 1/13* (2006.01)

(52) U.S. Cl. ....................... 359/566; 349/202

(58) Field of Classification Search .............. 359/566, 359/569, 576; 349/201, 202
See application file for complete search history.

(56) References Cited

U.S. PATENT DOCUMENTS

| 4,011,009 A | * | 3/1977 | Lama et al. .................. 359/571 |
| 4,585,307 A | | 4/1986 | Dammann et al. |
| 6,480,334 B1 | | 11/2002 | Farn |
| 6,587,180 B2 | * | 7/2003 | Wang et al. .................. 349/202 |
| 2005/0063071 A1 | | 3/2005 | Wang et al. |

FOREIGN PATENT DOCUMENTS

JP 2003 066232 3/2003

OTHER PUBLICATIONS

European Search Report mailed Feb. 13, 2009.

* cited by examiner

*Primary Examiner* — Alessandro Amari
(74) *Attorney, Agent, or Firm* — Scott D. Wofsy; Edwards Angell Palmer & Dodge LLP (57) ABSTRACT

A method of fabricating a membrane structure for a diffractive phased array assembly is provided. The method includes the steps of providing a wafer having a body and at least a membrane layer and a backside layer disposed on opposite faces of the body, forming a grating pattern on a surface of the membrane layer, and forming a window through the wafer to expose a back surface of the membrane, thereby allowing light to pass through the membrane.

11 Claims, 6 Drawing Sheets

MEMBRANE GRATING FOR BEAM STEERING DEVICE AND METHOD OF FABRICATING SAME

CROSS-REFERENCE TO RELATED APPLICATIONS

This Application is a divisional application of U.S. patent application Ser. No. 12/062,205, filed Apr. 3, 2008, which claims the benefit of priority of U.S. Provisional Patent Application No. 60/922,128, filed Apr. 6, 2007, which application is hereby incorporated by reference in its entirety.

BACKGROUND

1. Field of the Invention

The subject invention is directed to a diffractive phased array assembly used as a beam steering device in an optical system, and to a method of fabricating and constructing such an assembly.

2. Description of Related Art

Diffractive phased array assemblies are used as beam steering devices in many optical systems such as bar code scanners, laser machining applications and laser printers, as discussed in U.S. Pat. No. 6,480,334 to Farn, the disclosure of which is herein incorporated by reference in its entirety.

A known diffractive phased array design used as a beam steering device in LIDAR (Laser Imaging Detection and Ranging) applications is formed from 2-inch square silicon plates. The surfaces of these plates are patterned with complimentary microscopic grating features that are used to steer a monochromatic laser beam of a prescribed wavelength when the array plates are placed in intimate contact and one plate is transversely displaced with respect to the other.

Figure 1:
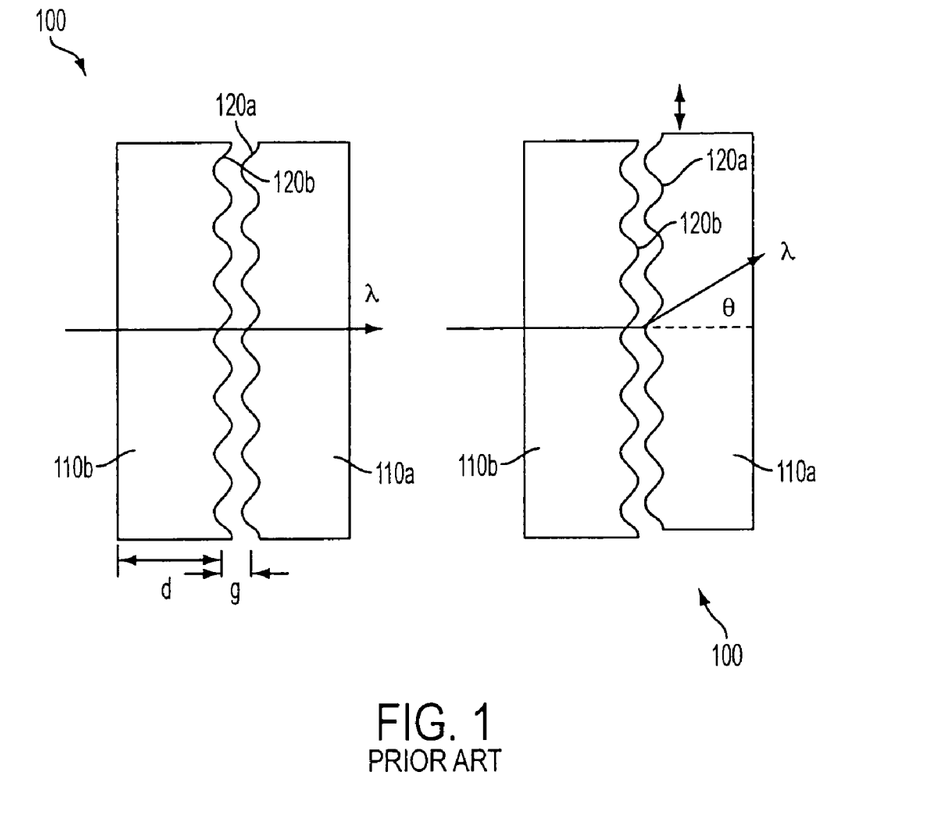
FIG. 1 illustrates a state of the art assembly wherein patterned plates of a thickness d are separated by a gap g, whereby the relative translation of the plates shifts the direction of the output beam $\lambda$ by an angle $\theta$.

In the current state of the art design, which is shown for example in FIG. 1, the plate thickness d is about 1-2 mm, the plate spacing g is approximately 1 µm and the depth of the grating features is approximately 0.5 µm. This design yields a theoretical $0^{th}$-order optical throughput that is close to unity and remains above 50% for angles θ as large as +/−20°. However, the throughput falls off dramatically for gap sizes that are greater than 1 µm.

The sensitivity of the optical throughput to the localized plate spacing significantly limits the usefulness of this state of the art design. Moreover, substrate imperfections such as warp and wedge non-uniformities can be significantly larger than 1 µm across the face of the plate, even for the highest quality material available. Additional warping can occur when the plates are mounted to a translation mechanism used to vary the output beam angle.

Figure 2:
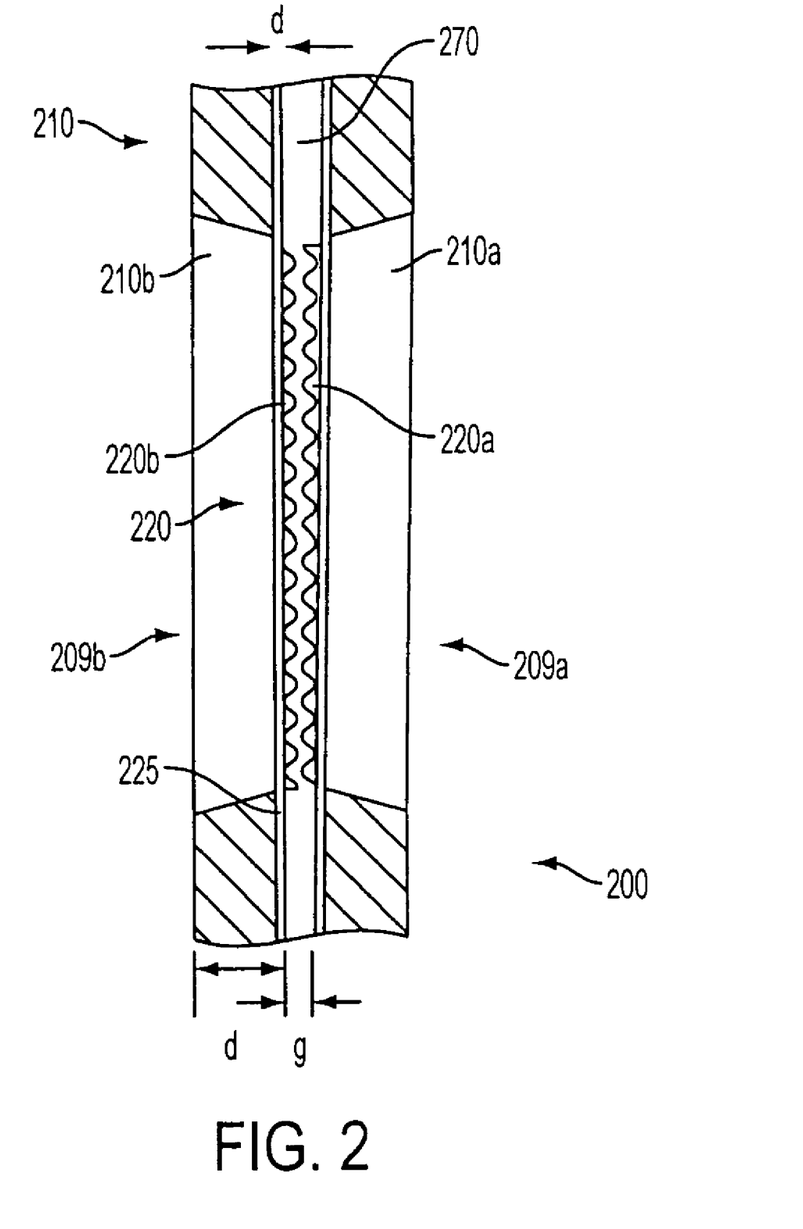
FIG. 2 illustrates a pair of patterned membranes of thickness d' separated by a gap g.

Applicant recognizes that the manufacturability of the state of the art assembly can be markedly improved by replacing one or both plates with membrane structures, as shown for example in FIG. 2, which illustrates one device in accordance with the invention. In such an instance, the substrate 210 is removed from the grating area 220, leaving only a membrane 225 of thickness d which could be on the order of the plate spacing, as explained in more detail below.

SUMMARY OF THE INVENTION

The subject invention is directed to a new and useful diffractive phased array assembly for use as a beam steering device in an optical system. Such beam steering devices can be utilized in a beam sending capacity, such as in close proximity to a laser intended to scan a particular field of regard. Alternatively or additionally, such beam steering devices can be utilized in conjunction with sensors that are adapted and configured to scan a field of regard.

In accordance with one aspect of the invention, a method of fabricating a membrane structure for a diffractive phased array assembly is provided. The method includes the steps of providing a wafer having a body and at least a membrane layer and a backside layer disposed on opposite faces of the body, forming a grating pattern on a surface of the membrane layer, and forming a window through the wafer to expose a back surface of the membrane, thereby allowing light to pass through the membrane.

In accordance with any embodiment of the invention, the step of forming a window through the backside layer and wafer body can be performed through a photolithographic technique, and can includes the steps of applying a photoresist layer on the face of the backside layer, exposing the photoresist in a pattern to define the window, removing the photoresist in regions where etching is to occur, and etching through at least the backside layer to partially form the window. The photoresist layer can be any thickness necessary, but in a preferred embodiment is about 7 µm thick.

In accordance with any embodiment of the invention, the wafer body can first be etched to a predetermined depth with a first etching technique, and subsequently etched with a second etching technique to complete the etch of the wafer body. The first etching technique can be deep reactive ion etching, and the second etching technique can be a chemical etch, such as one with tetramethylammonium hydroxide. The predetermined etch depth can be about 100 µm, for example, but depend on the thickness of the wafer. The thickness of the membrane layer can be as desired, for example between about 10 µm and 75 µm.

If so desired, in connection with any embodiment of the invention, the wafer can further include an etch-stop layer underlying the membrane layer. Accordingly, the method can further include the steps of etching through the wafer to partially form the window, and etching through the etch-stop layer to the membrane layer to fully form the window.

Fabrication of a membrane structure can further include the step of mounting the membrane structure in a protective fixture prior to the step of etching of the etch stop layer, in order to protect the membrane layer. The etch stop layer, in the designated area, is removed with a suitable substance, for example with a buffered oxide etch.

The materials of the wafer body, backside layer, the etch stop layer, and the membrane layer can be selected so that when a window is formed through the wafer up to the membrane layer, the materials therein exhibit internal or hoop stresses sufficient to provide tension to the membrane layer, to maintain the membrane layer substantially flat.

The wafer body can be formed of any suitable material, such as silicon, the backside layer likewise can be formed of any suitable material, such as silicon nitride, the etch stop layer can be formed of any suitable material, such as silicon dioxide, and the membrane layer can be formed of any suitable material, such as silicon.

In accordance with any embodiment of the invention, a method of manufacture can include the step of confirming that the flatness of the membrane structure is within allowable limits.

Methods in accordance with the invention can further include the step of baking the membrane structure for a length of time at a temperature and humidity sufficient to promote sufficient oxide growth on the membrane. This step can be performed in an aqueous medium, such as in a beaker of water, for example.

In accordance with another aspect of the invention, a diffractive phased array assembly includes first and second membrane structures. Each membrane structure has a membrane layer with a patterned grating defined thereon. The membrane layers of the two membrane structures are in operative contact with one another so as to form a gap therebetween.

An index matching fluid can be provided within the gap formed between the patterned surfaces of the first and second membrane structures. The index matching fluid can be one that has an ultra-low viscosity.

The first and second membrane structures can be adapted for relative translational movement, substantially parallel to the membrane surface.

Each of the first and second membrane structures can be provided with internal stresses to apply tension to the membrane layer to maintain the membrane layer flat.

In accordance with another aspect of the invention, a diffractive phased array assembly includes a plate structure having a patterned grating defined thereon and a membrane structure having a patterned grating defined thereon, wherein the patterned grating of the plate and the patterned grating of the membrane are in operative contact with one another so as to form a gap therebetween. An index matching fluid can be provided within the gap formed between the patterned surfaces of the plate structure and membrane structure.

The plate structure and membrane structure can be adapted for relative translational movement, substantially parallel to the respective gratings.

As mentioned, it is envisioned that a gap between adjacent gratings can be filled with a low viscosity, refractive index matching fluid, which functions to pull the two membrane layers together through surface tension, so as to maintain a uniform gap. The fluid should have mechanical and thermal properties that are suitable for a variety of operating environments, including high and low temperature environments. Further, the presence of the fluid may additionally serve to provide damping to reduce any undesirable vibrations. However, it should be understood that devices in accordance with the invention can be provided without such a fluid. Alternatively still, devices in accordance with the invention can be embodied such that they are fully enclosed in a fluid filled space, as will be described in more detail below.

Alternative fabrication methods are also envisioned. For example, a timed etching step can be employed to alleviate the need for an etch-stop layer below the membrane layer. It is also envisioned that the membrane can be fabricated by a dry etching process or by a wet etching process.

These and other aspects of the diffractive phased array assembly and method of fabrication will become more readily apparent from the following detailed description of the preferred embodiments taken in conjunction with the drawings briefly described below.

BRIEF DESCRIPTION OF THE DRAWINGS

So that those skilled in the art to which the subject invention pertains will readily understand how to make and use the subject invention without undue experimentation, preferred embodiments thereof will be described in detail hereinbelow with reference to certain figures, wherein.

DETAILED DESCRIPTION OF PREFERRED EMBODIMENTS

Figure 3A:
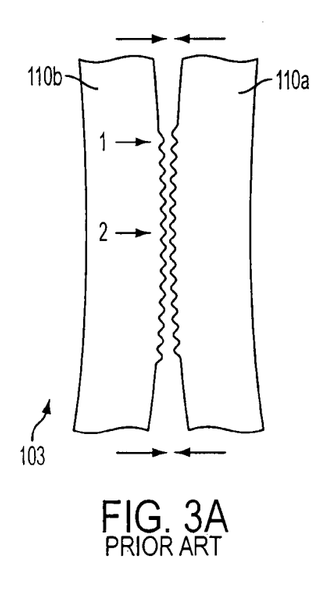
FIG. 3a illustrates the state of the art plate design in which uniform plate spacing cannot be maintained as a result of imperfect substrates.
Figure 3B:
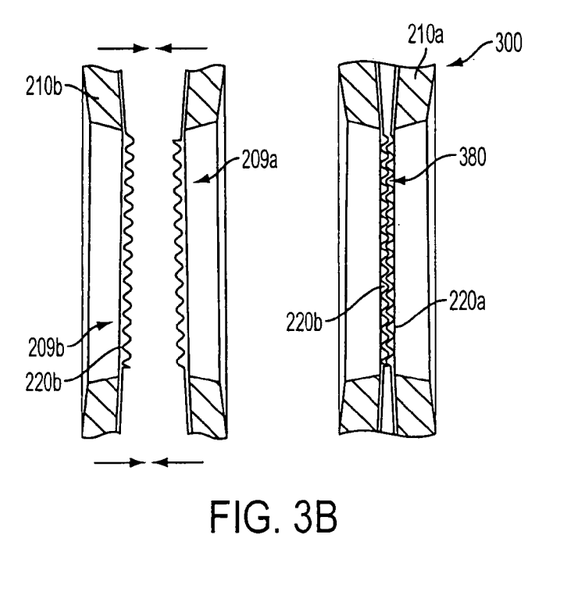
FIG. 3b illustrates how strain is used to pull the thin membrane gratings flat, allowing uniform spacing therebetween, and wherein the uniform spacing is ensured by placing an appropriate index matching fluid in the gap between the membranes.

The benefits of the subject invention are shown in FIGS. 3a-3b, which compare a conventional diffractive phased array plate assembly 103 to an assembly 300 having membrane structures formed by a method in accordance with the subject invention. FIG. 3a illustrates a realistic case where the substrates 110a, 110b are slightly warped, demonstrating the difficulty in maintaining relatively small uniform plate spacing. For example, the plates could be in intimate contact at one location 2, while the gap between the plates could be tens of microns or larger at another location 1.

FIG. 3b illustrates how the two patterned gratings can be brought into operative uniform contact using a membrane grating approach. If the net strain of the combined structure is such that the thin film membrane layer 225 is pulled tightly across a window 209a, 209b formed in the substrate 210a, 210b, it will no longer exhibit the curvature of the substrate 210a, 210b. While this serves to reduce or eliminate the effects of substrate curvature, depending on the precise conditions devices in accordance with the invention experience, there still may be challenges in maintaining a small spacing (e.g., of about 1 µm) between two membrane gratings 220a, 220b. For example, the spacing may be affected by thermal or mechanical perturbations. Applicant has determined that one manner suitable for overcoming such problems is placing a refractive index matching fluid 380, which can be an ultra-low viscosity fluid, between the two membrane gratings 220a, 220b, as shown for example in FIG. 3b. Such fluids may include, for example water, mineral oil, or other index matching fluids typically used in optical applications. If a hydrophilic fluid is specified, the fluid will wet the membrane gratings 220a, 220b and surface tension will pull the gratings 220a, 220b together and maintain a uniform spacing therebetween.

Figure 5:
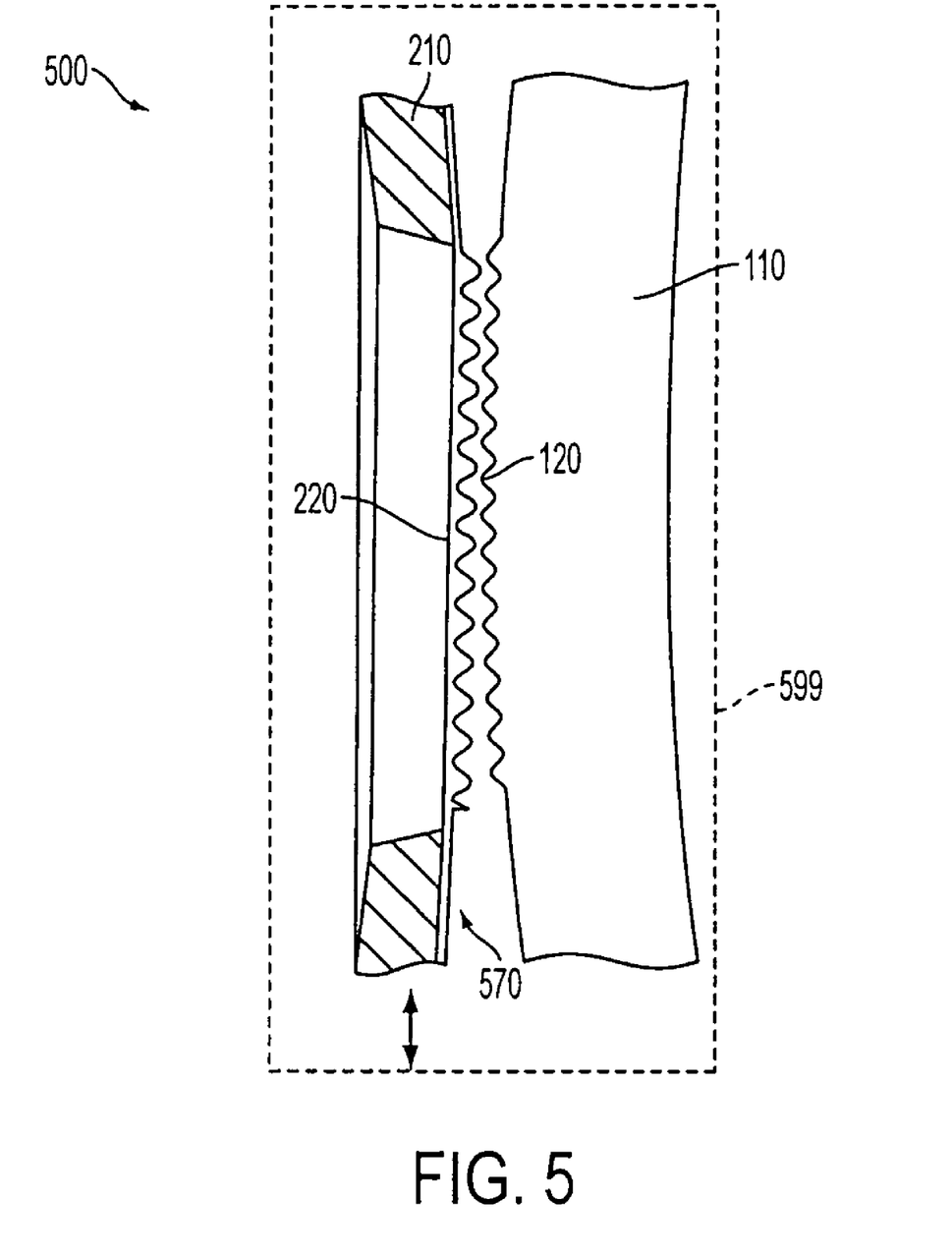
FIG. 5 is a cross-sectional view of an alternate aspect of the invention, illustrating a conventional plate-like structure used in conjunction with a membrane structure constructed in accordance with the present invention, with an optional housing provided therewith.

As illustrated in FIG. 5, it is envisioned and well within the scope of the subject disclosure that a diffractive phased array assembly can alternatively be constructed using one conventional plate structure, as illustrated in FIG. 3A, for example, and one membrane structure manufactured in accordance with the present invention, as illustrated in FIG. 3B, for example. In accordance with this embodiment, such plate and membrane structures each are provided with a patterned grating defined thereon. Although not required, in such an instance the membrane structure can be arranged so that the membrane grating effectively blankets the plate structure, allowing the gratings to be in mutual operative contact with one another, with a defined spacing or gap therebetween. Alternatively, the gratings can simply be brought into close contact with one another Although not required in accordance with the invention, Applicant conceives that the membrane grating can advantageously be pulled closer to the plate grating by providing a fluid, such as an ultra-low viscosity fluid therebetween.

Figure 4A:
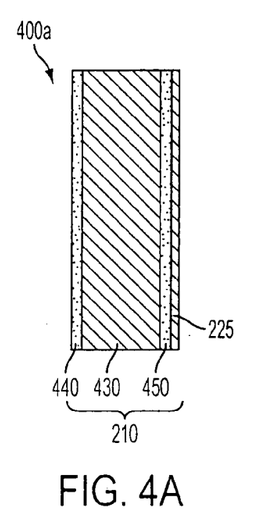
FIGS. 4a through 4e illustrate the steps for fabricating a membrane structure in accordance with a preferred embodiment of the of the subject invention.
Figure 4B:
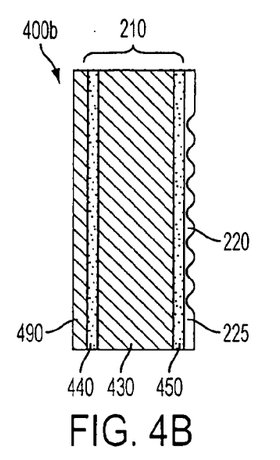

Referring now to FIGS. 4a through 4e, there are illustrated example steps of fabricating a membrane grating in accordance with one aspect of the invention. In accordance with this aspect, a first step (FIG. 4a) includes providing a starting material that includes a Si (Silicon) layer 430 having an upper Si membrane layer 225, with an intervening etch-stop layer 450. The etch stop layer 450 can be, for example, $SiO_2$ (Silicon dioxide). A backside layer 440, which can be $Si_3N_4$ (Silicon Nitride), for example is also provided for structural rigidity and to provide, if desired, internal tensile hoop stresses, resulting in a bending moment (indicated by "M" in FIG. 4e) to the assembly to assist providing tension (indicated by "T" in FIG. 4e) to the membrane 225 and grating formed thereon The silicon nitride layer 440 also serves as a more robust mask layer during the etch of the silicon layer 430. Photoresist is usually adequate for a plasma or reactive ion etch. However, in accordance with the invention, a combination of dry and wet etches can be used for deep silicon etching. The photoresist layer 490, may be less effective during a wet etch portion. Accordingly, the nitride layer can serve to protect against undercutting of the photoresist 490, which could otherwise compromise the silicon etch. Thereafter, as shown in FIG. 4b, a grating pattern is defined on the membrane layer 225, which can be accomplished in any suitable fashion. The membrane can be defined, by way of general binary optics technology, as set forth in U.S. Pat. No. 6,480,334 to Farn.

As shown in FIG. 4b, a photoresist layer 490 is applied to the back side of the backside layer 440. The photoresist can be applied prior to or following the above-mentioned step of defining a grating in the membrane layer 225, provided that the process of forming such grating does not damage the photoresist layer. The photoresist layer can be of any thickness required, which is about 7.0 µm in one embodiment. Either a positive or negative photoresist can be used, such as AZ9260®, manufactured by MicroChemicals GmbH of Ulm, Germany, for example.

Then, the photoresist is exposed. Applicant has used a Quintel 1200, manufactured by Neutronix-Quintel of Morgan Hill, Calif., USA, that allows exposure of the photoresist while allowing for manual alignment of the wafer, which is more accurate than auto-alignment systems of other similar devices. The photoresist layer 490, in areas where etching is desired is then removed.

Figure 4C:
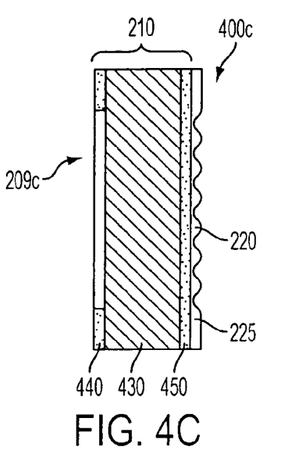

Subsequently, as shown in FIG. 4c, a window 209 is etched in the backside layer 440 to expose the Si layer 430. In accordance with the invention, this step can be performed by any suitable technique. In a preferred embodiment, this step is performed with DRIE (Deep Reactive Ion Etching). DRIE is a highly anisotropic etch process suitable for creating deep, steep-sided holes and trenches in wafers, with high aspect ratios.

Figure 4D:
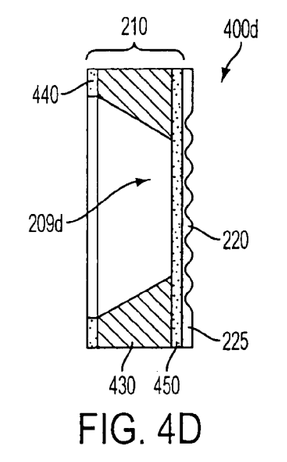

Etching of the window 209 through the Si layer 430 is continued, which etching stops at the etch stop layer 450, as shown in FIG. 4d. In accordance with the invention, this step can be performed by any suitable technique. In a preferred embodiment, this step is performed with tetramethylammonium hydroxide (TMAH). It should be noted that the drawings should not be relied upon for illustrating precise relative measurements. For example, the slope of the sidewalls of the backside window 209 formed in the silicon layer 430 may be more or less steep than illustrated in FIGS. 4d and 4e. Similarly, the precise thicknesses of layers cannot be judged by referring solely to the drawings.

Optionally, subsequently the wafer 400d can be mounted in a protective fixture to prevent damage to the membrane 225 during removal of the etch stop layer 450 in the region of the backside window 209.

Figure 4E:
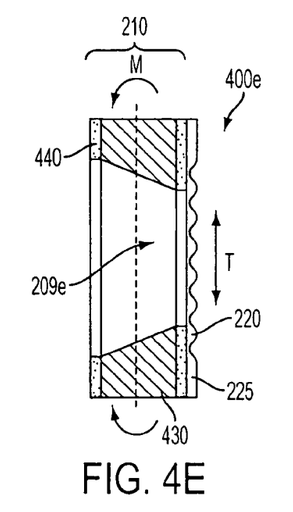

The etch stop layer 450 in the region of the backside window 209 is then removed by a suitable compound. The membrane 225, which is formed from an upper membrane layer 225 is fully defined by etching the etch stop layer 450 in the backside window 209d, to yield a backside window 209 configured as shown in FIG. 4e. The etch-stop $SiO_2$ layer allows for a consistent and accurate membrane thickness of the membrane 225, and thus for the grating 220. Etching of the etch stop layer 450, which in the present embodiment is silicon dioxide, may be accomplished by using a suitable etchant, preferably a BOE (buffered oxide etch), due to the selective nature of such an etch. Alternatively, the silicon dioxide layer can be etched with a non-buffered hydrofluoric acid (HF) solution, for example.

Subsequently, the flatness of the membrane 225 can be measured. A 2-d profiler, such as a Cyberscan Vantage, manufactured by Cyber Technologies, GmbH of Ingolstadt, Germany can be used for this purpose. In accordance with the invention, the flatness of the whole assembly 400e, or solely that of the membrane 225 in the region of the window 209e can be measured. In accordance with the invention, it is preferred that the membrane flatness be verified both after performing the last etch step, and after mounting the assembly 400e to a holder, if any. That is, the assembly 400e can be mounted to a holding structure for incorporation into a larger optical system. It is preferred that flatness is confirmed at that point as well, should any non-uniform stresses be applied to the assembly 400e, and hence to the membrane 225. In accordance with the invention, flatness measurements can be taken in one direction and then again perpendicular to that direction (e.g., along a defined "x-axis" and then a perpendicular "y-axis").

Subsequently, the assembly 400e can be baked to promote sufficient oxide growth, to allow the grating 200 to wet. This step can be repeated as necessary to achieve the desired results. In accordance with the invention, this step can occur at about 95° C. for about 2.0 hours. Typically, semiconductor surfaces are "passivated" or stabilized. Although silicon naturally oxidizes by forming a very thin layer thereon, such a layer may not be sufficiently thick to render the surface thereof sufficiently hydrophobic for use in conjunction with an intervening fluid, in accordance with the invention.

Forming a window 209 in the membrane grating 400 allows internal stresses developed within the composite structure to deform the annular region surrounding the window 209. The internal compressive hoop stress of the etch stop layer 450, serves to pull the membrane 225 flat, and ensures that the edges of the silicon layer 430 do not interfere with intimate positioning of adjacent membranes of companion grating assemblies 400. Preferably, the backside layer 440 is essentially stress-free or exhibits slight internal tensile hoop stress, so as to prevent countering the strain effects of the etch stop layer 450. The thickness of the membrane 225, in accordance with one aspect, should be as large as possible, limited by the ability of the internal stresses within the etch stop layer 450 to pull the membrane 225 flat. In accordance with the invention, the membrane 225 is between 3.0 and 100.0 µm (microns). In preferred embodiments, the thickness of the membrane layer 225 is one of about 10.0 µm, about 50 µm and about 75 μm. Naturally, the precise thickness can be selected as desired, and be anywhere in the range between about 0.5 μm and 3000.0 μm (3.0 mm) in thickness, at any 1.0 μm increment or portion thereof therebetween. Membranes in accordance with the invention can be even larger, if so desired. Naturally, depending on the precise thickness of the membrane, the robustness of remaining structure should be increased so as to maintain sufficient tension in the membrane to maintain the membrane flat.

In accordance with the invention, the assembly 400 can have any desired shape or size practical. Although there are no concrete limitations on size of the assemblies 400 in accordance with the invention, the size of the window opening 209 will depend on the optics of the associated application. For example, to steer an outgoing beam the window 209 can be on the order of the beam size, for example as small as between 1 mm and 10 mm. If a return signal must also be captured, the window dimension will be set by the optical design of the collection optics. Typically in such an instance, larger sizes would be preferred, but processing difficulties would limit that size. In accordance with the invention, a 2 inch (5 cm) diameter window 209 can be provided. Regarding membrane thickness, a thicker membrane 225 is preferred. However, a thicker membrane 225 can cause increased difficulties in compensating for its strain, as discussed herein.

Additionally, the optical distance (or "gap") between the two gratings 220a, 220b should be minimized. It is conceived by Applicant that an assembly including two gratings can be provided where the gratings are provided on opposite sides of the membrane 225, from the illustrated arrangement. This would provide a larger spacing between the membranes themselves, with a fluid (gas or liquid) disposed therebetween. Such an arrangement may ease fabrication but would result in gratings even farther apart than illustrated herein, which would affect steering efficiency. Similarly, but likely to suffer even greater steering efficiency losses, each assembly 400 of the pair utilized (as in FIG. 2) can be reversed, having the substrate 210 portions adjacent to one another with the membranes 220 arranged on opposite sides thereof.

With respect to the layer thicknesses, the membrane layers are preferably on a micron-scale e.g., between 5 μm and 1000 μm, for example. With a larger area of the membrane 225 exposed by the window 209, a thicker membrane layer 225 is typically required to ensure mechanical stability. If the membrane layer 225 is transparent to the light source being used, such as a particular frequency of laser, absorptive losses are not an issue. In such an instance, mechanical stability and strain balancing drive the minimum and maximum thickness for the membrane 225. The thickness of the etch stop layer 450 is preferably minimized and is typically limited by the selectivity of the etching process. Accordingly, the thickness of the etch stop layer 450 is between about 1000 and 5000 angstroms. The thickness of the backside layer 440 is then designed to compensate for the etch stop 450 strain and ensure the membrane 225 exhibits sufficient strain. As can be appreciated, precise dimensions are dependent on a number of factors, that are tied together and depend significantly on the specific materials used.

As illustrated, the starting material 400a, which includes a silicon substrate, etch stop layers and the like, has a substantially circular cross section—that is, the material is substantially cylindrical. In accordance with one aspect of the invention, the starting material is preferably about 4 inches (10 cm) in diameter. The finished assembly 400e, in accordance with this aspect, has a membrane 225 spanning a window 209e having a diameter of between 1 inch and 2 inches (2 cm and 5 cm) with a substantially circular cross-sections. However, such particular size and shape are not required in accordance with the invention.

In accordance with the invention, manufacturing methods of devices set forth herein can include the steps of confirming the flatness of a membrane grating 220, and baking the membrane gratings to promote native oxide growth thereon.

Figure 4F:
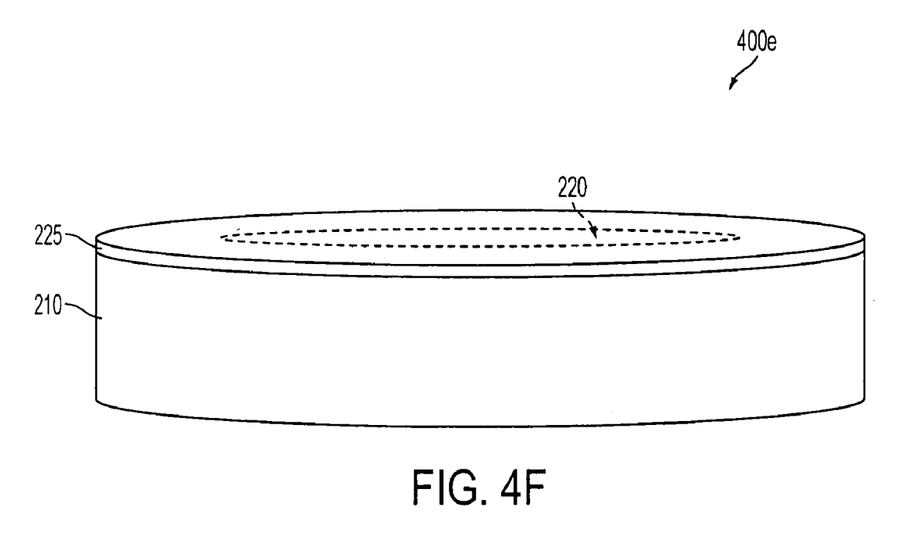
FIG. 4f is an isometric view illustrating a finished membrane structure manufactured in accordance with the invention.

FIG. 4f is an isometric view illustrating a finished membrane structure 400e of FIG. 4e, manufactured in accordance with the invention.

Processing of a silicon wafer to arrive at the starting material 400a shown in FIG. 4a can include any of a variety of suitable steps. For example, the etch stop layer 450, if silicon dioxide, can be formed by treating the surface of the silicon wafer 430. The etch stop layer 450 can be deposited, by way of vapor deposition, for example or another technique. Alternatively, the etch stop layer 450 can be formed between the main silicon layer 430 and the membrane layer 225 by way of ion implantation such as SIMOX (Separation by Implantation of Oxygen), wafer bonding techniques, or seed techniques. Such techniques can be utilized to manufacture the starting material in accordance with the invention, as will be recognized by those skilled in the art.

The backside layer 440 can be applied to the silicon wafer 430 in any of the foregoing manners, such as by way of a wafer bonding technique. Alternatively, and in the case of a backside layer 440 formed of silicon nitride on a silicon substrate, the backside layer 440 can be formed by reacting the silicon wafer 430 with nitrogen gas at high temperature. Alternatively still, chemical vapor deposition or plasma-enhanced chemical vapor deposition techniques can be utilized in accordance with the invention.

Similarly, devices in accordance with the invention can be manufactured by using wafer bonding techniques and/or deposition techniques, without etching, or in combination with etching steps, as long as the resulting membrane grating is maintained flat when completed. Applicant have conceived, as set forth herein, that an advantageous manner of maintaining a membrane grating flat is to form it in connection with a supporting structure that applies tension to the membrane. In the aforementioned embodiments, this is due to internal stresses developed within the supporting structure.

FIG. 5 is a cross-sectional view of a further aspect of the invention, illustrating a membrane grating assembly 500, including a conventional plate-like structure 110, as those illustrated in FIG. 1, used in conjunction with a membrane structure assembly 400 constructed in accordance with the present invention, as those illustrated in FIGS. 2, 3b and 4a-4f, for example. As illustrated, a membrane grating assembly 500 includes two gratings 120, 220, respectively disposed on the plate structure 110 and membrane structure assembly 400. As with any embodiment set forth herein, the assembly 500 is adapted for relative translational movement to allow the assembly to steer a beam of light passing therethrough.

As set forth above, a fluid can be supplied to fill the gap 570 between the two gratings 120, 220. Alternatively, a fluid can fully surround the assembly 500, including in-between the gratings 120, 220, as indicated by housing 599. Such an arrangement may be useful in situations where additional protection from damage is desired and/or the damping effects of a surrounding fluid would be advantageous. Nevertheless, the portion of fluid that is provided in the gap 570 serves to maintain a consistent spacing between the plates and hence the accuracy of the device as a whole.

It is preferred that the material selection, including substrates for membrane and plate grating manufacture have a relatively high refractive index in comparison with the medium in which the device will operate. Although this medium is typically air, depending on the precise implementation, that may not be the case. Similarly, the fluids disposed between and/or around the gratings would preferably have a relatively low index of refraction in comparison with the grating materials. Such a combination of high index materials results in a device that is capable of steering a beam of light across a broader field. Additionally, the materials selected should have very good transparency for the wavelengths of light with which they are to be used.

Once the device is assembled, it can be calibrated, based on the refractive indices of the particular materials used, and can thereafter be successfully deployed as a beam steering device.

While the diffractive phased array assemblies and methods of fabrication of the subject invention have been shown and described with reference to preferred embodiments, those skilled in the art will readily appreciate that various changes and/or modifications may be made thereto without departing from the spirit and scope of the subject invention as defined by the appended claims. Particularly, it is to be understood that the precise methods of manufacture can vary from those set forth explicitly herein, perhaps utilizing different materials and/or processing techniques and/or different processing chemicals, as will be appreciated by one skilled in the art.

Further, it is to be understood that elements of devices or steps of methods described in connection with a particular embodiment may be advantageously applied to other embodiments of the invention, and are not limited to specific embodiments, unless explicitly described as such.

What is claimed is:

1. A diffractive phased array assembly comprising first and second membrane structures, each membrane structure having a membrane layer with a patterned grating defined in a surface portion of the membrane layer, wherein the membrane layers of the two membrane structures are in operative contact with one another so as to form a gap therebetween and wherein the first and second membrane structures are adapted for relative translational movement, substantially parallel to the membrane surface.

2. A diffractive phased array assembly as recited in claim 1, wherein an index matching fluid is provided within the gap formed between the patterned surfaces of the first and second membrane structures.

3. A diffractive phased array assembly as recited in claim 2, wherein the index matching fluid has an ultra low viscosity.

4. A diffractive phased array assembly as recited in claim 1, wherein each of the first and second membrane structures is provided with internal stresses to apply tension to the membrane layer to maintain the membrane layer flat.

5. A diffractive phased array assembly comprising: a plate structure having a patterned grating defined thereon and a membrane structure having a patterned grating defined in a surface portion of the membrane layer, wherein the patterned grating of the plate and the patterned grating of the membrane are in operative contact with one another so as to form a gap therebetween and wherein the plate structure and membrane structure are adapted for relative translational movement, substantially parallel to the respective gratings.

6. A diffractive phased array assembly as recited in claim 5, wherein an index matching fluid is provided within the gap formed between the patterned surfaces of the plate structure and membrane structure.

7. A diffractive phased array assembly comprising first and second membrane structures, each membrane structure having a membrane layer with a patterned grating defined thereon, wherein the membrane layers of the two membrane structures are in operative contact with one another so as to form a gap therebetween wherein the first and second membrane structures are adapted for relative translational movement, substantially parallel to the membrane surface.

8. A diffractive phased array assembly as recited in claim 7, wherein an index matching fluid is provided within the gap formed between the patterned surfaces of the first and second membrane structures.

9. A diffractive phased array assembly as recited in claim 8, wherein the index matching fluid has an ultra low viscosity.

10. A diffractive phased array assembly as recited in claim 7, wherein the first and second membrane structures are adapted for relative translational movement, substantially parallel to the membrane surface.

11. A diffractive phased array assembly as recited in claim 7, wherein each of the first and second membrane structures is provided with internal stresses to apply tension to the membrane layer to maintain the membrane layer flat.

* * * * *